United States Patent [19]

Hofmann, Jr.

[11] 4,024,909

[45] May 24, 1977

[54] TEMPERATURE RESPONSIVE MULTI-FUNCTION VALVE

[75] Inventor: Rudolf Hofmann, Jr., Diedenbergen, Germany

[73] Assignee: Sullair Corporation, Michigan City, Ind.

[22] Filed: June 2, 1975

[21] Appl. No.: 583,033

[30] Foreign Application Priority Data

June 6, 1974 Germany ............... 7419504[U]

[52] U.S. Cl. ................. 165/35; 62/193; 236/34.5
[51] Int. Cl.² .............................. G05D 23/02
[58] Field of Search .......... 165/35; 62/192, 193; 236/101 A, 100, 34.5; 418/84, 85

[56] References Cited

UNITED STATES PATENTS

| | | | |
|---|---|---|---|
| 2,164,605 | 7/1939 | Young | 165/35 |
| 2,419,630 | 4/1947 | Cruzan et al. | 236/34 |
| 2,788,176 | 4/1957 | Andersen | 236/34.5 |
| 2,975,973 | 3/1961 | Carroll | 236/34.5 |
| 3,300,135 | 1/1967 | Slater et al. | 236/34.5 |
| 3,353,590 | 11/1967 | Holman | 165/35 |
| 3,554,440 | 1/1971 | Austin | 236/34.5 |
| 3,905,729 | 9/1975 | Bauer | 418/84 |

*Primary Examiner*—William E. Wayner
*Attorney, Agent, or Firm*—Wegner, Stellman, McCord, Wiles & Wood

[57] ABSTRACT

A multiple function valve for a compressor cooling liquid system. A cylindrical valve housing has an inlet at one end and an outlet at the other with a flow passage therethrough. A thermal valve controls the liquid flow between the inlet and outlet and diverts liquid to a heat exchanger connected with ports in the valve body. A pressure responsive on-off valve is located between the thermal valve and the outlet. A filter is connected between the inlet and the thermal valve.

9 Claims, 1 Drawing Figure

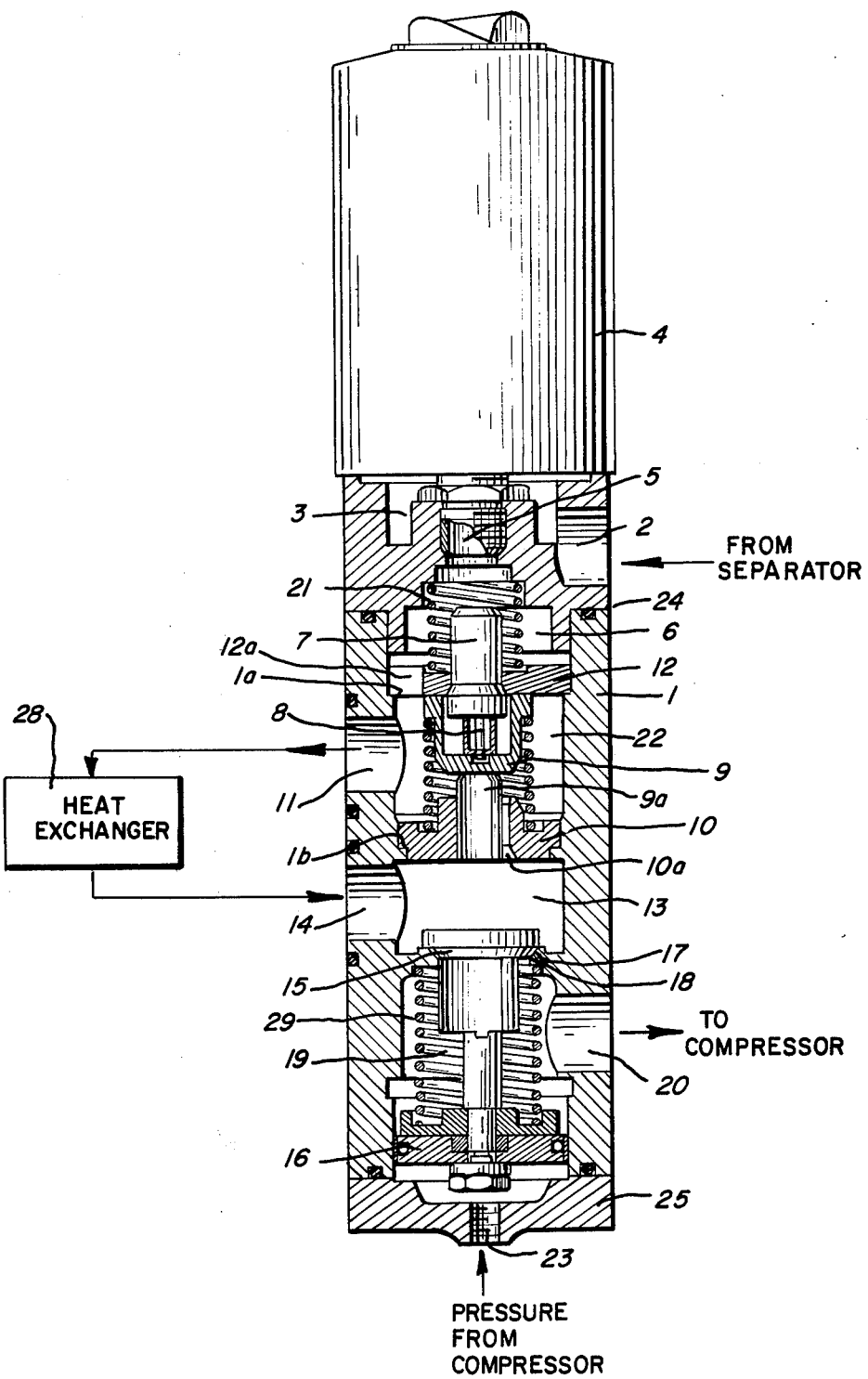

TEMPERATURE RESPONSIVE MULTI-FUNCTION VALVE

This invention relates to a multi-function valve particularly intended for the cooling liquid system of a compressor.

In a typical rotary screw compressor a liquid, as mineral oil, is injected for cooling and for sealing the blow gap between the screws and between each screw and the compressor housing. The cooling liquid is discharged from the compressor at the temperature of the compressed gas and must, before being reused, be cooled to an appropriate temperature. A thermal valve directs the cooling liquid either to a heat exchanger or through a bypass to the compressor. It is also desirable to filter the liquid. Furthermore, there must be provided a shutoff valve which stops injection of liquid when the compressor is turned off, to prevent the compressor from being flooded with the cooling liquid.

Separate devices (valves, filters) of different types are known for these various functions. The individual devices must be interconnected by liquid lines or conduits, and often the devices have different size connections, so that they can be connected only by means of reducing or transition couplings. Apart from the apparatus complexity associated therewith, a considerable number of joints are required for the cooling liquid under high pressure which are a latent source of trouble, especially where the compressor is not mounted in a stationary fashion and the equipment is subjected to vibrations.

A principal feature of the invention is a flow regulating valve which reduces the equipment complexity required for handling and controlling the cooling liquid, and which in particular reduces considerably the number of joints susceptible to faults.

More particularly, in a valve housing there are provided, in series order as seen in the direction of flow, an inlet, a filter, a flow passage having a thermal valve, ports on each side of the thermal valve for connection with a cooling liquid heat exchanger, an on-off valve arranged to be actuated by fluid under pressure to respectively open or close said through passage, and an outlet.

By this construction, substantially all functions for handling and controlling the cooling liquid can be implemented within one valve, whereby time and costs can be saved in manufacture. Moreover, the valve reduces to a minimum the required joints, resulting in an operation of the unit which is less susceptible to faults.

Further features of the invention will be apparent from the following description and from the accompanying drawing, which is a longitudinal sectional view of a preferred embodiment of the valve.

A cylindrical valve housing 1 has an inlet 2 for connection with the gas-liquid separator at the outlet of the compressor. Cooling liquid at substantially the compressor discharge temperature flows into valve housing 1 under the compressor pressure. Inlet 2 is in communication with an annular space 3 from which the cooling liquid flows through a filter 4, shown diagrammatically, which filter defines the upper portion of cylindrical valve housing 1. From filter 4 the cooling liquid passes through a centrally disposed bore 5 in the valve housing into a space 6 in which there is thermal valve operator 7 having a pressure-resistant receptacle around which the cooling liquid flows and which contains a material which will expand in response to an increase in temperature. The increased volume of the expansion material results in a downward displacement motion of plunger 8. The thermal valve operator 7 is mounted in a plate 12 which has peripheral apertures 12a for flow of the cooling liquid. Plate 12 is held against shoulder 1a in the cylindrical housing by a spring 21 and is free to move upwardly a limited distance. The plunger 8 of the thermal valve operator 7 bears against a valve member 9 with a guide 9a which engages in a through bore 10a formed in a partition wall 10 of the housing. When the temperature of the cooling liquid rises, plunger 8 moves valve member 9 downwardly against spring 22 to restrict the flow of cooling liquid through bore 10a. When the temperature of the cooling liquid flowing in at 2 reaches an upper limit value, the correspondingly heated thermal valve operator 7 is effective to push plunger 8 out to such an extent that valve member 9 will fully close the through bore 10a. At a given lower limit value of the temperature of the inflowing cooling liquid, the plunger 8 will be fully retracted, as shown in the drawing, for maximum flow through bore 10a. Valve member 9 and the valve seat on partition 10 may be of complementary conical configuration. In the case of abutment of the valve member 9 on partition 10 and any further stroke movement of plunger 8, plate 12 moves in an upward direction against spring 21.

The space in front or ahead of partition 10 in the valve housing, into which the cooling liquid passes from space 6 through the apertures 12a in plate 12, is connected to a cooler or heat exchanger 28, through a first radial bore or port 11 formed in the housing wall. On the same side of the valve housing, in the same cross-sectional plane, there is provided a second radial bore or port 14 through which the cooling liquid from the cooler reenters the valve housing and passes into a space 13. If bore 10a is completely closed by thermal valve 9, the only way for the cooling liquid to pass into space 13 is via the cooler, while on the other hand, if valve body 9 is retracted from partition 10, all of the cooling liquid flows through this bore 10a into space 13, virtually shorting out the cooler. Depending on the temperature of the cooling liquid flowing in at 2, the proportion of the amount of liquid flowing through the bore 10a can be infinitely varied from 0% and 100%. When there is a partial flow through bore 10a, the cooled portion and the noncooled portion of the liquid mix in chamber 13 and an intermediate temperature will be established. The two radial bores 11 and 14 for connection to the cooler are preferably arranged and designed so that the flow regulating valve can be mounted directly on the cooler housing. Preferably the cooler housing connections are side by side and the two bores are in a common radial plane with the spacing between the bores corresponding with the spacing between the cooler housing connections.

From space 13 the cooling liquid, cooled to a predetermined temperature, flows through a bore 18 in partition 17 across the valve housing and into space 19 and to a radially extending outlet port 20, back to the injection bores on the compressor. The bore 18 is closed by an on-off control valve 15 which is connected to a plunger 16 movable axially within valve housing 1 and urged to the valve closed position by spring 29. The plunger is adapted to have fluid under pressure applied thereto through port 23. During normal operation of the compressor, valve body 15, by appropriate application of pressurized fluid, as gas from the compressor, through port 23 to piston 16, is lifted away from its valve seat on partition 17 so that the cooling liquid can flow out through outlet port 20. If the compressor is shut down, the pressure on piston 16 is relieved and valve 15 closes. This avoids flooding the compressor with cooling liquid.

With a view to a simple construction of the valve housing, a jointing plane 24 extending transversely to the longitudinal axis of the housing is conveniently provided in the region of the thermal valve operator 7. As indicated in the drawing, the partition wall 10 with bore 10a is a separate member held in position against shoulder 1b by compression spring 22. A cover 25 is secured to the bottom of the housing. Filter 4 may be located within the upper portion of valve housing 1 as shown, or may be connected ahead of inlet port 2.

By appropriately selecting the thermal valve operator 7, the temperature of the cooling liquid emerging from the compressor is kept above the saturation temperature of water vapor so that the volume of the cooling liquid will not be increased by water or, respectively, no emulsion will be formed. In compressor units of the closed circulation operation type, the proper viscosity of the cooling liquid is maintained for operation of the compressor unit.

I claim:
1. A valve for compressor cooling liquid, comprising:
   a housing having an inlet for connection with the cooling liquid separator, an outlet for connection with a compressor, and a flow passage therethrough between the inlet and outlet;
   a pair of valve seats disposed in said housing along the flow passage between the inlet and outlet;
   a first port between the inlet and one valve seat for connection with the intake port of a cooling liquid heat exchanger;
   a second port between said one valve seat and the outlet for connection with the discharge port of the cooling liquid heat exchanger;
   a first valve member adapted to cooperate with said one valve seat and seal the flow passage, said first valve member being actuated by a thermal operator responsive to the cooling liquid temperature to regulate the ratio of direct flow of cooling liquid through the flow passage to the indirect flow of cooling liquid through the heat exchanger, said first valve member opening the flow passage when the cooling liquid is cool and closing the flow passage when the cooling liquid is hot; and
   a second valve member adapted to cooperate with the other valve seat and seal the flow passage, said second valve member being responsive to the operation of the compressor to open the flow passage when the compressor is operating and to close the flow passage when the compressor is not operating to control the flow of cooling liquid through the valve and the heat exchanger.

2. The valve of claim 1 including a filter in series with said flow passage between the inlet and said first port.

3. The valve of claim 1 wherein said thermal operator is disposed between the inlet and said first port.

4. The valve of claim 1 further including a partition within the housing extending transversely to the flow passage having said one valve seat formed therein, said first and second ports being spaced axially on the housing, one on either side of said partition, and opening outwardly in a common plane for connection with the heat exchanger.

5. The valve of claim 1 wherein said other valve seat is disposed between said second port and the outlet.

6. The valve of claim 5 further including a piston valve operator movable axially in the housing between the outlet and the end of the housing, spring means urging said second valve member against said other valve seat to close the flow passage, and an inlet at the end of the housing communicating with the compressor, whereby pressure from the compressor moves said piston to lift said second valve member off said other valve seat and open the flow passage.

7. The valve of claim 6 further including a partition within the housing extending transversely to the flow passage between said second port and the outlet having said other valve seat formed therein.

8. A valve for compressor cooling liquid, comprising:
   a housing with an axis having an inlet at one end for connection with the cooling liquid separator, an outlet at the other end for connection with a compressor and a flow passage extending axially therethrough between the inlet and outlet;
   a thermal valve in said flow passage including a first partition extending transversely across said housing, with a bore therethrough, a valve member movable axially with respect to said partition, a thermal actuator carried by an apertured second partition extending transversely of said housing, and a coil spring supporting said apertured partition and accommodating axial movement thereof;
   a first port between the thermal valve and the inlet for connection with the inlet of a cooling liquid heat exchanger; and
   a second port between the thermal valve and outlet for connection with the outlet of the cooling liquid heat exchanger, said thermal valve being responsive to the cooling liquid temperature to regulate the ratio of direct flow of cooling liquid through the flow passage to the indirect flow of cooling liquid through the heat exchanger.

9. The valve of claim 8 wherein said first partition is disposed between said first port and said second port and said apertured partition is disposed between the inlet and said first port, said apertured partition being moved against the biasing force of said spring by said thermal actuator in response to continued operation of said thermal actuator after said valve has been moved against said first partition.

* * * * *